United States Patent
Kwon (10) Patent No.: US 8,612,054 B2
(45) Date of Patent: Dec. 17, 2013

(54) ROBOT WALKING CONTROL APPARATUS AND METHOD THEREOF

(75) Inventor: Woong Kwon, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 166 days.

(21) Appl. No.: 12/656,020

(22) Filed: Jan. 13, 2010

(65) Prior Publication Data

US 2010/0185330 A1  Jul. 22, 2010

(30) Foreign Application Priority Data

Jan. 22, 2009 (KR) .................. 10-2009-0005678

(51) Int. Cl.
*G05B 15/00* (2006.01)
*G05B 19/00* (2006.01)

(52) U.S. Cl.
USPC ........... 700/261; 700/245; 700/253; 700/258; 700/260

(58) Field of Classification Search
None
See application file for complete search history.

(56) References Cited

U.S. PATENT DOCUMENTS

| | | | | |
|---|---|---|---|---|
| 4,308,615 | A * | 12/1981 | Koegel et al. | 714/46 |
| 6,961,640 | B2 * | 11/2005 | Kuroki et al. | 700/245 |
| 7,103,447 | B2 * | 9/2006 | Di Profio et al. | 700/245 |
| 7,949,428 | B2 * | 5/2011 | Endo et al. | 700/245 |
| 2003/0120388 | A1 * | 6/2003 | Kuroki et al. | 700/245 |
| 2004/0148268 | A1 * | 7/2004 | Reil | 706/904 |
| 2004/0153212 | A1 * | 8/2004 | Profio et al. | 700/245 |
| 2005/0113973 | A1 * | 5/2005 | Endo et al. | 700/245 |
| 2006/0026162 | A1 * | 2/2006 | Salmonsen et al. | 707/10 |
| 2007/0016329 | A1 * | 1/2007 | Herr et al. | 700/250 |
| 2007/0162164 | A1 * | 7/2007 | Dariush | 700/61 |
| 2007/0220637 | A1 * | 9/2007 | Endo et al. | 901/2 |
| 2008/0135312 | A1 * | 6/2008 | Nakamura et al. | 180/8.3 |

OTHER PUBLICATIONS

Kang Kang Yin et al., SIMBICON: Simple Biped Locomotion Control, University of British Columbia, 10 pages (in English).
Jessica K. Hodgins et al., "Simulation of Human Running", Georgia Institute of Technology 1994 IEEE, pp. 1320-1325 (in English).

* cited by examiner

Primary Examiner — Ian Jen
(74) Attorney, Agent, or Firm — Staas & Halsey LLP (57) ABSTRACT

Disclosed are a robot walking control apparatus, which removes an ineffective motion, generated by a robot walking based on torque, by selecting a motion state of the robot based on torque and controlling torques of joints of the robot so that a ZMP of the robot is located in a safety area, when the walking of the robot is controlled, and a method thereof.

10 Claims, 7 Drawing Sheets

ROBOT WALKING CONTROL APPARATUS AND METHOD THEREOF

CROSS-REFERENCE TO RELATED APPLICATIONS

This application claims the benefit of Korean Patent Application No. 2009-0005678, filed Jan. 22, 2009, in the Korean Intellectual Property Office, the disclosure of which is incorporated herein by reference.

BACKGROUND

1. Field

The embodiments relate to a robot walking control apparatus and a method thereof, and more particularly, to a robot walking control apparatus, which removes an ineffective motion in a torque-based walking robot, and a method thereof.

2. Description of the Related Art

Recently, biped walking robots, which have a joint system similar to that of a human being, and easily walk with two feet in human working and living spaces, have been vigorously researched and developed. Bipedal walking has disadvantages, such as instability and difficulty in pose control or walking control, as compared with quadruped walking or hexapod walking. However, bipedal walking has advantages, such as more flexibly coping with a discontinuous walking surface, i.e., an uneven surface of the ground, or stairs.

Methods of controlling the bipedal walking of a robot include a position-based (meaning the following of a target position of a robot joint), zero moment point (hereinafter, referred to as 'ZMP') control method, and a torque-based (meaning the following of a target torque of a robot joint) finite state machine (hereinafter, referred to as 'FSM') control method.

In the ZMP control method, a walking direction, a step width, and a walking speed are set in advance so that a ZMP of a robot satisfies a ZMP constraint, i.e., a condition that the ZMP is located in a safety area within a support polygon composed of a supporting leg or supporting legs. When the robot is supported by one foot, the safety area is the area of this foot. When the robot is supported by both feet, the safety area is the area having a small size within a convex polygon including areas of both feet. Walking patterns of respective legs corresponding to the set items are generated, and walking trajectories of the respective legs are calculated according to the walking patterns. Further, positions of joints of the respective legs are calculated through an inverse kinematical equation of the calculated walking trajectories, and target control values of the respective joints are calculated based on current positions and target positions of the respective joints. Further, a servo control, in which the respective legs follow the calculated walking trajectories per control time, is carried out. When the respective legs are deviated from the walking trajectories in walking, torques of motors are controlled so that the respective legs exactly follow the walking trajectories.

In the FSM control method, a robot does not walk by following positions per control time, but properly walks by referring to motion states of the robot, which are defined in advance, in walking. That is, in the FSM control method, states of the respective motions of a walking robot (meaning states in an FSM) are defined in advance, target torques of respective joints are calculated with reference to the states of the respective motions in walking, and the joints are controlled such that the joints follow the target torques, thereby allowing the robot to properly walk.

The torque-based FSM control method is a control method, which is generally based on torque instructions, is applied to the structure of an elastic mechanism using back-drivability and thus has high energy efficiency, and has low rigidity and thus is generally safe. The torque-based FSM control method allows the robot to assume various poses by converting the motion state of the robot in walking, but causes the robot to perform a separate motion to maintain its balance regardless of the walking motion to accomplish a given task due to the selection within the restricted motion states. A step motion of stamping the foot of the robot is typical of this balancing motion. Such a motion may be unnecessary if the robot maintains its balance, and thus causes time delay and energy waste due to inefficiency.

SUMMARY

Therefore, one aspect of the invention is to provide a robot walking control apparatus, which removes an ineffective motion being irrelevant to a walking motion to perform a given task when a torque-based walking control is carried out, and a method thereof.

Additional aspects and/or advantages will be set forth in part in the description which follows and, in part, will be apparent from the description, or may be learned by practice.

The foregoing and/or other aspects may be achieved by providing a robot walking control apparatus including a robot including a plurality of legs; and a controller to control torques of joints of the robot by unification of a torque-based walking control method and a position-based walking control method.

The controller may compensate for motion quantities of the joints of the robot based on position when the motion state of the robot is converted. The controller may compensate for motion quantities of the joints of the robot so that a ZMP of the robot is located in a safety area. The safety area may be set to satisfy a ZMP constraint of the robot. The controller calculates the ZMP of the robot according to positions, velocities, and accelerations of the respective joints obtained using a sensor installed at the robot.

The foregoing and/or other aspects may be achieved by providing a robot walking control apparatus including a robot including a plurality of legs, the legs including a plurality of joints; and a controller to select a torque-based control mode or a position-based control mode, and to control the joints based on a position when a motion state of the robot is converted to the torque-based control mode.

The foregoing and/or other aspects may be achieved by providing a robot walking control method including selecting a motion state of a robot based on a torque of joints of the robot; calculating a ZMP of the robot to convert the selected motion state; and controlling the torques of the joints including determining whether or not the zero moment point (ZMP) of the robot is located in a predetermined safety area.

When the ZMP of the robot is not located in the safety area, compensatory motion quantities of the joints of the robot may be calculated by Expression 2:

$$\Delta x(tk+1) = k(tk)(Px(tk) - Pxd(tk)) + \Delta x(tk)$$

$$\Delta y(tk+1) = k(tk)(Py(tk) - Pyd(tk)) + \Delta y(tk) \quad \text{[Expression 2]}$$

where k is an adjusting parameter, Pxd is a target ZMP on the X-axis, Px is the current ZMP on the X-axis, Pyd is a target ZMP on the Y-axis, Py is the current ZMP on the Y-axis, ($\Delta x(tk+1)$, $\Delta y(tk+1)$) are recompensatory motion quantities of the current center of gravity (COG) of the robot on the X-axis and Y-axis, and ($\Delta x(tk)$, $\Delta y(tk)$) are recompensatory motion quantities of the former center of gravity (COG) of the robot on the X-axis and Y-axis.

The compensatory motion quantities Δθ of the respective joints are obtained by employing an inverse kinematical equation using a Jacobian from the compensatory motion quantity of the current center of gravity (COG) of the robot.

Torque instructions of the joints of the robot may be calculated using the compensatory motion quantities of the joints of the robot by Expression 3, $$\tau = kp(\theta d + \Delta\theta - \theta) - kd(d\theta/dt) \quad \text{[Expression 3]}$$

Where kp is a P gain in a PD control, kd is a D gain in the PD control, θd is a target position of a joint, θ is the current position of the joint, and Δθ is a compensatory motion quality of the joint.

The foregoing and/or other aspects may be achieved by providing a robot walking control method including selecting a torque-based control mode or a position-based control mode according to walking conditions determined using user instructions and data received from a sensor unit; compensating for motion quantities of joints of a robot based on position when the motion state of the robot is converted to the torque-based control mode; calculating torque instructions of the joints of the robot according to the compensatory motion quantities of the joints of the robot; and controlling walking the robot according to the calculated torque instructions.

The compensation of the motion quantities of the joints of the robot may be achieved by selecting a motion state of the robot, calculating a ZMP of the robot to convert the selected motion state, and compensating for the motion quantities of the joints of the robot so that the ZMP of the robot is located in a safety area, which is defined in advance.

BRIEF DESCRIPTION OF THE DRAWINGS

These and/or other aspects and advantages will become apparent and more readily appreciated from the following description of the embodiments, taken in conjunction with the accompanying drawings in which.

DETAILED DESCRIPTION OF EMBODIMENTS

Reference will now be made in detail to the embodiments, examples of which are illustrated in the accompanying drawings, wherein like reference numerals refer to like elements throughout. The embodiments are described below to explain the embodiments by referring to the annexed drawings.

Figure 1:
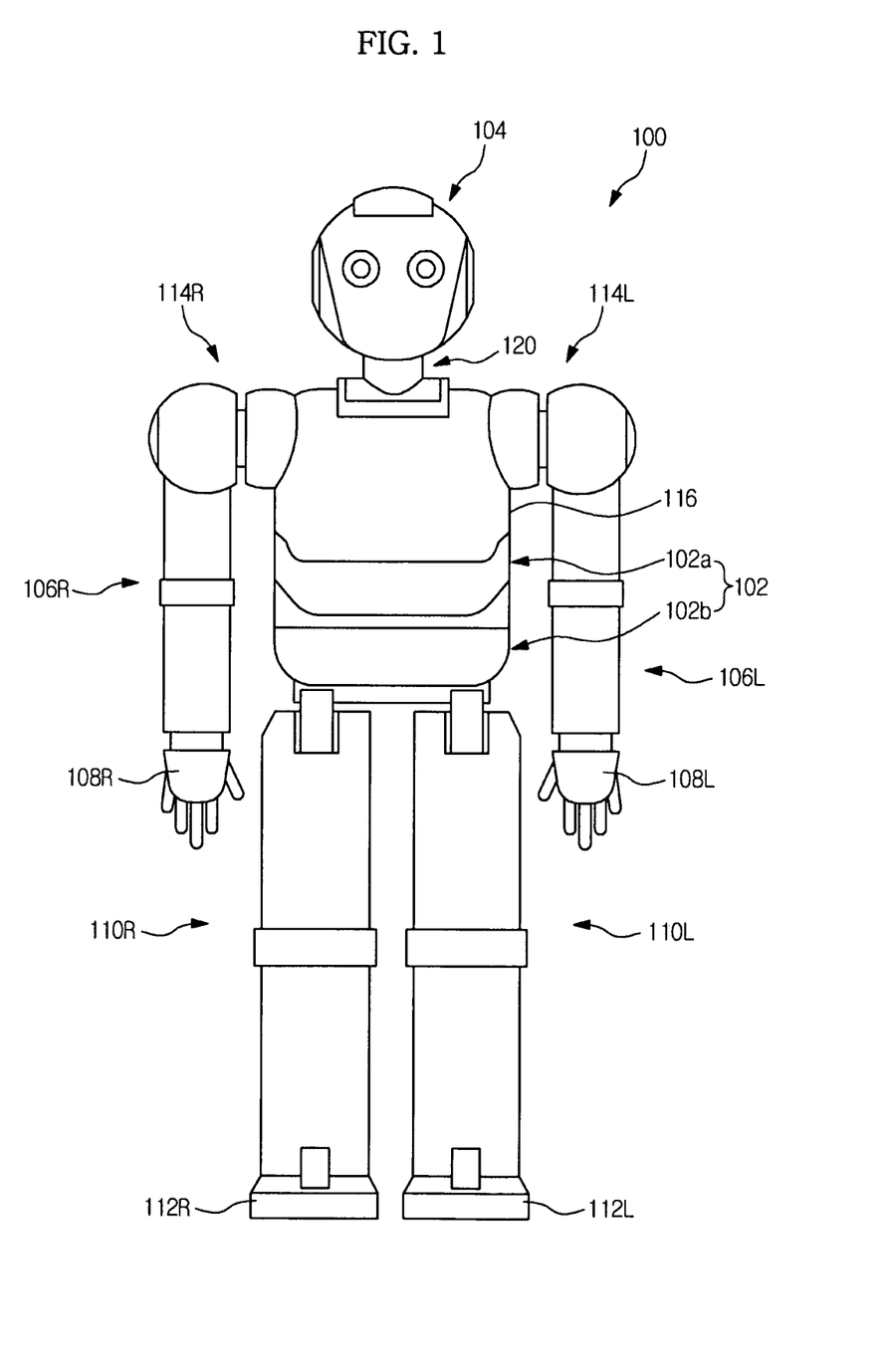
FIG. 1 is a schematic view illustrating the external appearance of a robot in accordance with one embodiment.

As shown in FIG. 1, a head 104 is connected to the upper portion of a torso 102 of a robot 100 through a neck 120. Two arms 106L and 106R are connected to both sides of the upper portion of the torso 102 through shoulders 114L and 114R. Hands 108L and 108R are respectively connected to tips of the arms 106L and 106R. Two legs 110L and 110R are connected to both sides of the lower portion of the torso 102. Feet 112L and 112R are respectively connected to tips of the legs 110L and 110R. The head 104, the two arms 106L and 106R, the two legs 110L and 110R, the two hands 108L and 108R, and the two feet 112L and 112R respectively have designated degrees of freedom through joints. The inside of the torso 102 is protected by a cover 116. Here, R represents the right side of the robot 100, and L represents the left side of the robot 100.

Figure 2:
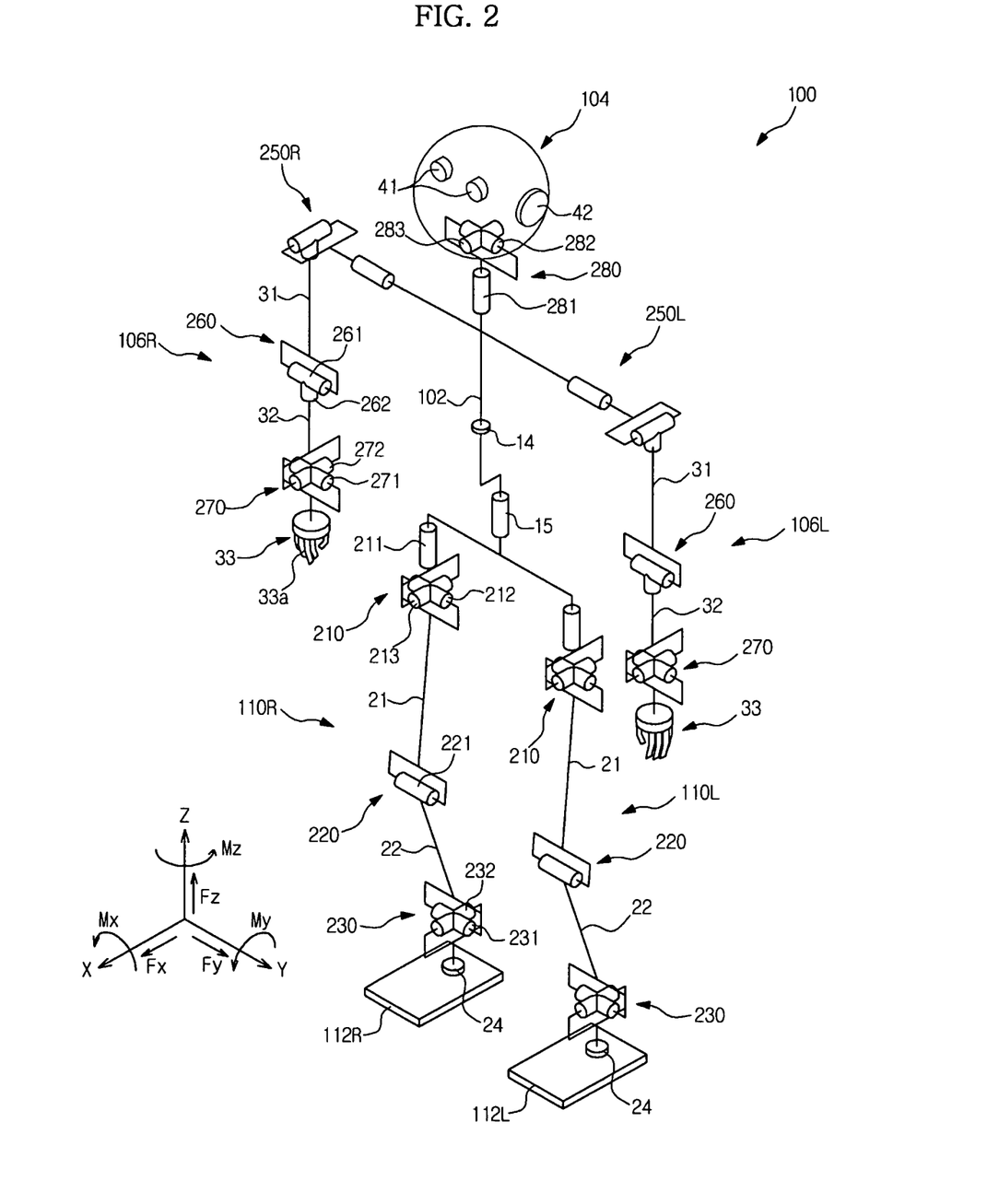
FIG. 2 is a view illustrating structures of joints of the robot of FIG. 1.

FIG. 2 is a view illustrating structures of joints of the robot of FIG. 1. As shown in FIG. 2, the legs 110L and 110R of the robot 100 respectively include thigh links 21, calf links 22, and the feet 112L and 112R. The thigh links 21 are connected to the torso 102 through thigh joint units 210. The thigh links 21 and the calf links 22 are connected to each other by knee joint units 220, and the calf links 22 and the feet 112L and 112R are connected to each other by ankle joint units 230.

The thigh joints units 210 respectively have 3 degrees of freedom. Specifically, the thigh joint units 210 respectively include rotary joints 211 rotated in a yaw direction (around the Z-axis), rotary joints 212 rotated in a pitch direction (around the Y-axis), and rotary joints 213 rotated in a roll direction (around the X-axis).

The knee joint units 220 respectively include rotary joints 221 rotated in the pitch direction, and thus have 1 degree of freedom. The ankle joint units 230 respectively include rotary joints 231 rotated in the pitch direction and rotary joints 232 rotated in the roll direction, and thus have 2 degrees of freedom.

Since the legs 110L and 11 OR respectively include six rotary joints for three joint units 210, 220, and 230, twelve rotary joints are provided for the two legs 110 and 110R.

Multi-axis force and torque (F/T) sensors 24 are respectively installed between the feet 112L and 112R and the ankle joint units 230 of the two legs 110L and 110R. The multi-axis F/T sensors 24 measure three-directional components (Mx, My, Mz) of moment and three-directional components (Fx, Fy, Fz) of force transmitted from the feet 112L and 112R, and thus detect whether or not the feet 112L and 112R land or loads are applied to the feet 112L and 112R.

A camera 41 to photograph the area around the robot 100 and a microphone 42 to input a user's voice are installed at the head 104.

The head 104 is connected to the torso 102 through a neck joint unit 280. The neck joint unit 280 includes a rotary joint 281 rotated in the yaw direction, a rotary joint 282 rotated in the pitch direction, and a rotary joint 283 rotated in the roll direction, and thus has 3 degrees of freedom.

Head rotating motors (not shown) are respectively connected to the rotary joints 281, 282, and 283 of the neck joint unit 280.

Shoulder joint assemblies 250L and 250R are mounted at the both sides of the torso 102, and thus connect the two arms 106L and 106R to the torso 102.

The arms 106L and 106R respectively include upper arm links 31, lower arm links 32, and the hands 33. The upper arm links 31 are connected to the torso 102 through the shoulder joint assemblies 250L and 250R. The upper arm links 31 and the lower arm links 32 are connected to each other through elbow joint units 260, and the lower arm links 32 and the hands 33 are connected to each other through wrist joint units 270.

The elbow joint units 260 respectively include rotary joints 261 rotated in the pitch direction and rotary joints 262 rotated in the yaw direction, and thus have 2 degrees of freedom. The wrist joint units 270 include rotary joints 271 in the pitch direction and rotary joints 272 rotated in the roll direction, and thus have 2 degrees of freedom.

Five fingers 33a are installed at each of the hands 33. Each of the fingers 33a includes plural joints (not shown), respectively driven by motors. The fingers 33a perform various motions, such as gripping of an object and directing of a special direction, in connection with the motion of the hands 106.

A pose sensor 14 is installed at the torso 102. The pose sensor 14 detects a tilt angle of the torso 102 relative to the vertical axis and its angular velocity, and thus generates pose data. The pose sensor 14 may be installed at the head 104 as well as the torso 102. Further, a rotary joint 15 rotated in the yaw direction to rotate a chest 102a relative to a waist 102b is installed between the chest 102a and the waist 102b of the torso 102.

Although not shown in the drawings, actuators, such as motors to respectively drive the rotary joints, are installed in the robot 100. A controller to control the overall operation of the robot 100 properly controls the motors, and thus allows the robot 100 to perform various motions.

Figure 3:
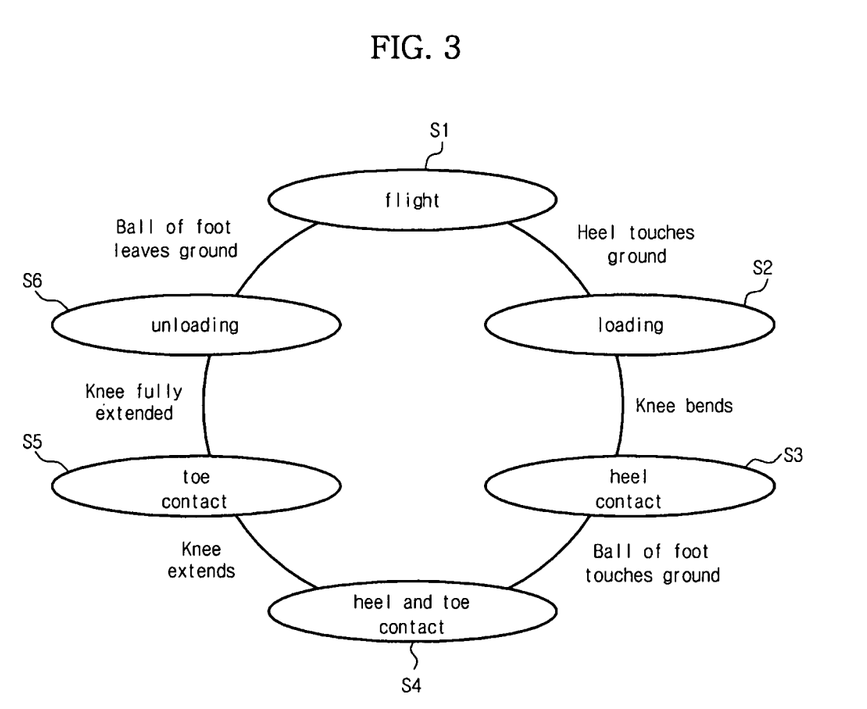
FIG. 3 is a view illustrating motion states and control motions of the robot when FSM-based walking is applied to the robot in accordance with one embodiment.

In the torque-based FSM control method, as exemplarily shown in FIG. 3, the operation of the robot is divided in a plurality of motion states, which are defined in advance, (6 states including S1, S2, S3, S4, S5, and S6 in FIG. 3). The respective motion states mean poses, which are assumed by the robot in walking, and the smooth walking of the robot is achieved by properly converting the poses of the robot (reference: J. Hodgins, "Simulation of Human Running", IEEE ICRA94).

In the first embodiment, as shown in FIG. 3, the first state (the flight state; S1) corresponds to a pose of swinging of a leg, the second state (the loading state; S2) corresponds to a pose of putting the foot of the leg down on the ground, the third state (the heel contact state; S3) corresponds to a pose of bringing the heel of the foot into contact with the ground, the fourth state (the heel and toe contact state; S4) corresponds to a pose of bringing both the heel and the toe of the foot into contact with the ground simultaneously, the fifth state (the toe contact state; S5) corresponds to a pose of bringing the toe of the foot into contact with the ground, and the sixth state (the unloading state; S6) corresponds to a pose of causing the foot to leave the ground.

In order to convert the respective motion states into other motion states, control motions for the state conversion are respectively required. A control motion of causing the heel of the foot to touch the ground is required in order to convert the first state into the second state (S1→S2), a control motion of causing the knee connected to the foot touching the ground to be bent is required in order to convert the second state into the third state (S2→S3), a control motion of causing the ball of the foot to touch the ground is required in order to convert the third state into the fourth state (S3→S4), a control motion of causing the knee connected to the foot touching the ground to be extended is required in order to convert the fourth state into the fifth state (S4→S5), a control motion of causing the knee connected to the foot touching the ground to be fully extended is required in order to convert the fifth state into the sixth state (S5→S6), and a control motion of causing the ball of the foot to leave the ground is required in order to convert the sixth state into the first state (S6→S1).

In order to perform the control motions, the robot calculates torque instructions of the respective joints corresponding to the respective control motions, and drives the actuators, such as the motors respectively installed at the joints, according to the calculated torque instructions.

In the torque-based walking control method, the walking of the robot is controlled depending on the respective motion states, which are defined in advance. Here, the walking of the robot is achieved even by the simple conversion of one state into another state to perform a given task. However, the control of the walking of the robot is insufficient only by the conversion of the motion state of the robot, and thus the robot may lose its balance. At this time, a motion of stamping the foot of the robot may be performed so as not to lose the balance of the robot, but this balancing motion delays a time to complete the task or causes waste of energy and thus it is necessary to prevent such an ineffective motion in advance.

In the torque-based FSM control method in accordance with the embodiment, when a random motion state is selected, a ZMP of the robot is calculated, and torque instructions of the respective joints are calculated by compensating for motion quantities of the respective joints so that the calculated ZMP of the robot satisfies the ZMP constraint, prior to the walking control performed according to the selected motion state. Hereinafter, this process will be described in detail.

Figure 4:
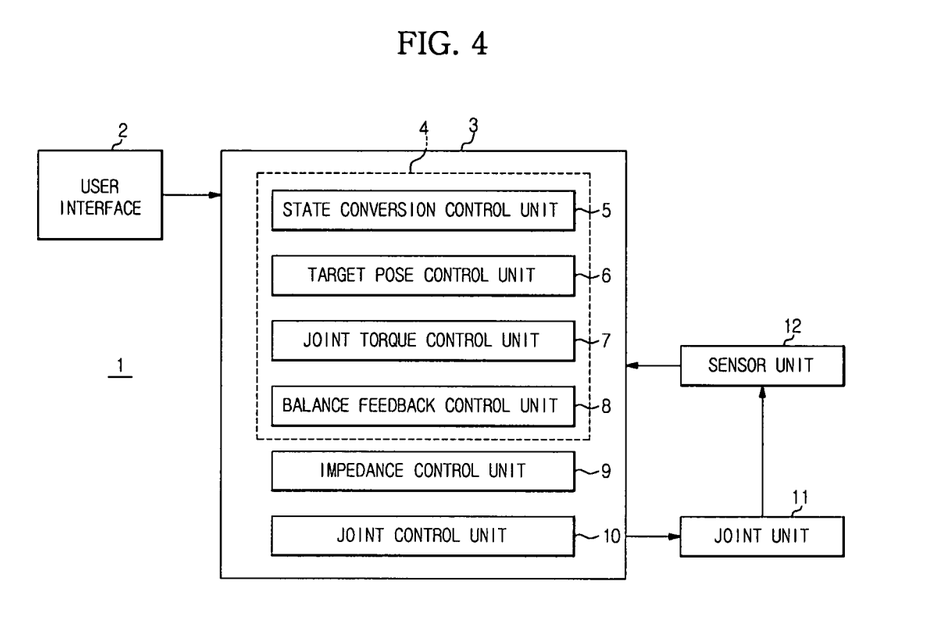
FIG. 4 is a block diagram of a robot walking control apparatus in accordance with a first embodiment.

As shown in FIG. 4, a robot walking control apparatus 1 in accordance with a first embodiment includes a controller 3, a user interface 2 to input user's instructions to control the robot, joint units 11 to drive the actuators, such as the motors respectively installed at the joints of the robot, and a sensor unit 12 installed at the robot to measure force respectively applied to the joints or the pose data of the robot.

The controller 3 controls the walking motion of the robot based on the user's instructions inputted through the user interface 2 and the data provided from the sensor unit 12. The controller 3 includes an FSM-based walking control unit 4, an impedance control unit 9, and a joint control unit 10. The FSM-based walking control unit 4 includes a state conversion control unit 5, a target pose control unit 6, a joint torque control unit 7, and a balance feedback control unit 8.

The state conversion control unit 5 selects a motion state, which will be carried out by the robot next to the current motion state of the robot, and the selected motion state becomes a target pose to be assumed by the robot.

The target pose control unit 6 calculates the torque instructions of the joints by compensating for the motion quantities of the respective joints so that the robot can stably assume the target pose. This method will be described in detail, with reference to FIG. 5. The target pose is selected according to the results of the state conversion control unit 5 (operation 51), and the current ZMP of the robot is calculated from the pose sensor and the positions, velocities, and accelerations of the respective joints through the sensor unit 12 (operation 52). Thereafter, it is determined whether or not the calculated ZMP is located in a safety area (operation 53).

Figure 5:
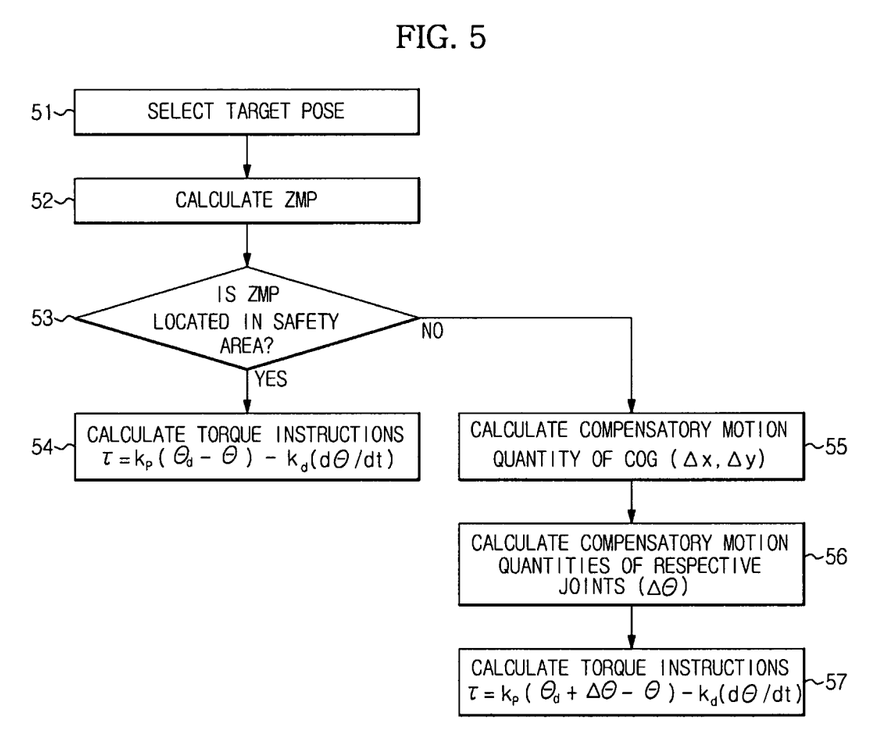
FIG. 5 is a flow chart illustrating a robot walking control method in accordance with the first embodiment.

When the calculated ZMP is located in the safety area, it is recognized that the ZMP satisfies the ZMP constraint, and torque instructions ($\tau$) of the joints are calculated using Expression 1 (operation 54):

$$\tau = k_p(\theta_d - \theta) - k_d(d\theta/dt) \quad \text{[Expression 1]}$$

In Expression 1, $k_p$ is a P gain in a PD control, $k_d$ is a D gain in the PD control, $\theta_d$ is a target position of a joint, and $\theta$ is the current position of the joint.

When the calculated ZMP is moved outside the safety area, a compensatory motion quantity ($\Delta x(t_{k+1})$, $\Delta y(t_{k+1})$) of the center of gravity (COG) of the robot is calculated so that the ZMP of the robot can follow a target value satisfying the ZMP constraint and thus be located in the safety area. The compensatory motion quantity is calculated by Expression 2 (operation 55):

$$\Delta x(t_{k+1})=k(t_k)(P_x(t_k)-P_{xd}(t_k))+\Delta x(t_k)$$

$$\Delta y(t_{k+1})=k(t_k)(P_y(t_k)-P_{yd}(t_k))+\Delta y(t_k) \quad \text{[Expression 2]}$$

In the above Expression 2, k is an adjusting parameter, $P_{xd}$ is a target ZMP on the X-axis, $P_x$ is the current ZMP on the X-axis, $P_{yd}$ is a target ZMP on the Y-axis, $P_y$ is the current ZMP on the Y-axis, $(\Delta x(t_{k+1}), \Delta y(t_{k+1}))$ is a compensatory motion quantity of the current center of gravity (COG) of the robot on the X-axis and Y-axis, and $(\Delta x(t_k), \Delta y(t_k))$ is a compensatory motion quantity of the former center of gravity (COG) of the robot on the X-axis and Y-axis.

The compensatory motion quantities $\Delta\theta$ of the respective joints are obtained by employing an inverse kinematical equation using a Jacobian from the compensatory motion quantity of the current center of gravity (COG) of the robot.

The target pose control unit 6 calculates compensatory motion quantities $(\Delta\theta(t_{k+1}))$ of the respective joints corresponding to the compensatory motion quantity $(\Delta x(t_{k+1}), \Delta y(t_{k+1}))$ of the center of gravity (COG) of the robot using the inverse kinematical equation calculated by the Jacobian (operation 56).

When the compensatory motion quantities of the respective joints are calculated, torque instructions of the respective joints are calculated based on Expression 3 (operation 57).

$$\tau = k_p(\theta_d + \Delta\theta - \theta) - k_d(d\theta/dt) \quad \text{[Expression 3]}$$

In the above Expression 3, $k_p$ is a P gain in the PD control, $k_d$ is a D gain in the PD control, $\theta_d$ is a target position of a joint, $\theta$ is the current position of the joint, and $\Delta\theta$ is a compensatory motion quality of the joint.

The joint torque control unit 7 generates torque control signals of the respective joints according to the calculated torque instructions. The balance feedback control unit 8 is employed in the general FSM control method (reference: K. Yin, K. Loken, M. Panne, "SIMBICON: Simple Biped Locomotion Control", SIGG2007), and serves to cope with an unmodeled error and an unstable situation occurring when the ZMP cannot yet enter the safety area even if the target pose control unit 6 employs the compensatory motion quantities.

The impedance control unit 8 outputs signals to perform the impedance control (rigidity control) of the respective joints according to the results of the FSM-based walking control unit 4, and the joint control unit 9 performs the control of torques and positions of the respective joints by the joint unit 11 according to the outputted signals.

Any one of the ZMP control method and the FSM control method is selected according to walking conditions of the robot, the control mode of the robot is converted into the other control mode based on the selected method, and the walking of the robot is controlled based on the converted control mode.

Figure 6:
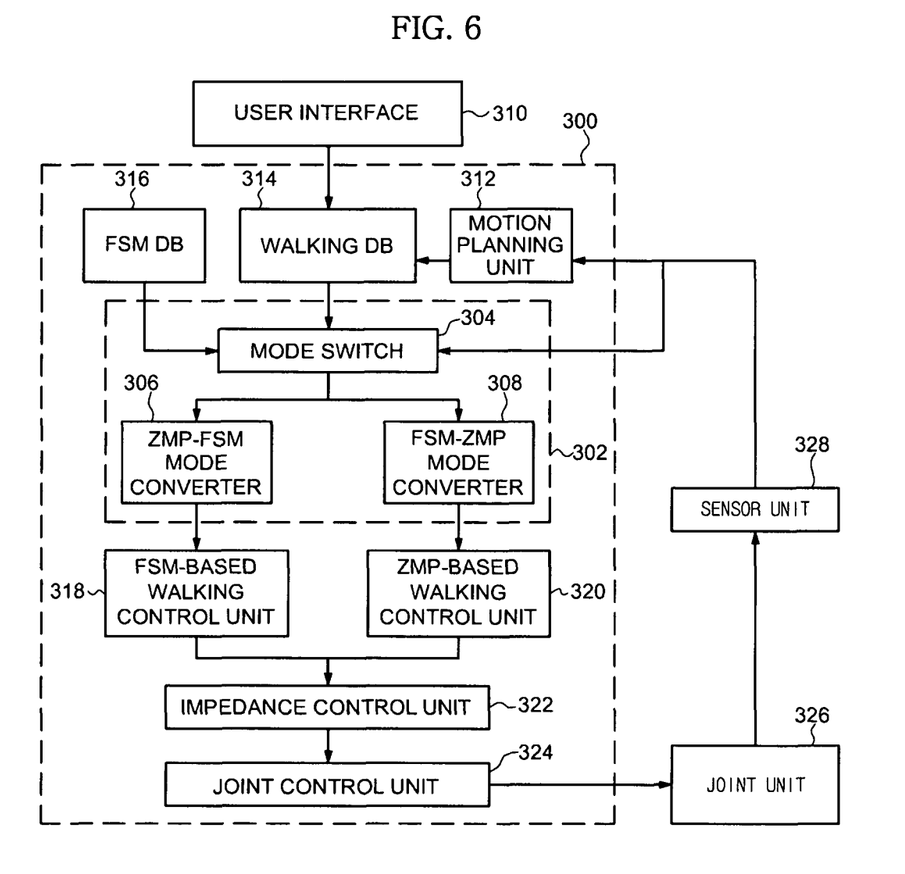
FIG. 6 is a block diagram of a robot walking control apparatus in accordance with a second embodiment.

As shown in FIG. 6, a controller 300 fundamentally performs the control of the walking of the robot 100, and further controls the walking of the robot 100 by selecting any one of the FSM-based walking control and the ZMP-based walking control according to the walking conditions of the robot 100 (whether or not a walking surface is even, or whether or not there is an obstacle). The controller 300 selects the FSM-based walking control in order to control the walking of the robot on an even topography or the relatively simple type walking of the robot. On the other hand, the controller 300 selects the ZMP-based walking control when the step width of the robot needs to be designated due to an uneven topography, such as stairs, or an obstacle, or the exact control of the motion of the whole body of the robot, such as the opening of a door or the transfer of an article, is required.

A mode set unit 302 includes a mode switch 304, a ZMP-FSM mode converter 306, and an FSM-ZMP mode converter 308. The mode switch 304 activates any one of the ZMP-FSM mode converter 306 and the FSM-ZMP mode converter 308 based on the current control mode (the FSM mode or the ZMP mode) of the robot 100, the user instructions inputted from the outside through the user interface 310, and the target motion of the robot 100 inputted through a motion planning unit 312, and mutually converts the walking control method of the robot 100. Further, when the mode switch 304 mutually converts the walking control method of the robot 100, the mode switch 304 refers to walking control data of a walking database 314, FSM control data of an FSM database 316, and force applied to the sole of a foot, torques of respective joints, a pose (inclination) of a torso, visual data, and auditory data, which are measured by a sensor unit 328.

The ZMP-FSM mode converter 306 converts the control mode of the robot 100 from a ZMP-based control mode to an FSM-based control mode. When the control mode of the robot 100 is converted into the FSM-based control mode, the motion of the robot 100 is controlled in the FSM control method by an FSM-based walking control unit 318. The FSM-ZMP mode converter 308 converts the control mode of the robot 100 from the FSM-based control mode to the ZMP-based control mode. When the control mode of the robot 100 is converted into the ZMP-based control mode, the motion of the robot 100 is controlled in the ZMP control method by a ZMP-based walking control unit 320. The control of the robot 100 is carried out through impedance control (rigidity control) of respective joints by an impedance control unit 322 and control of torques and positions of respective joint units 326 by a joint control unit 324.

Figure 7:
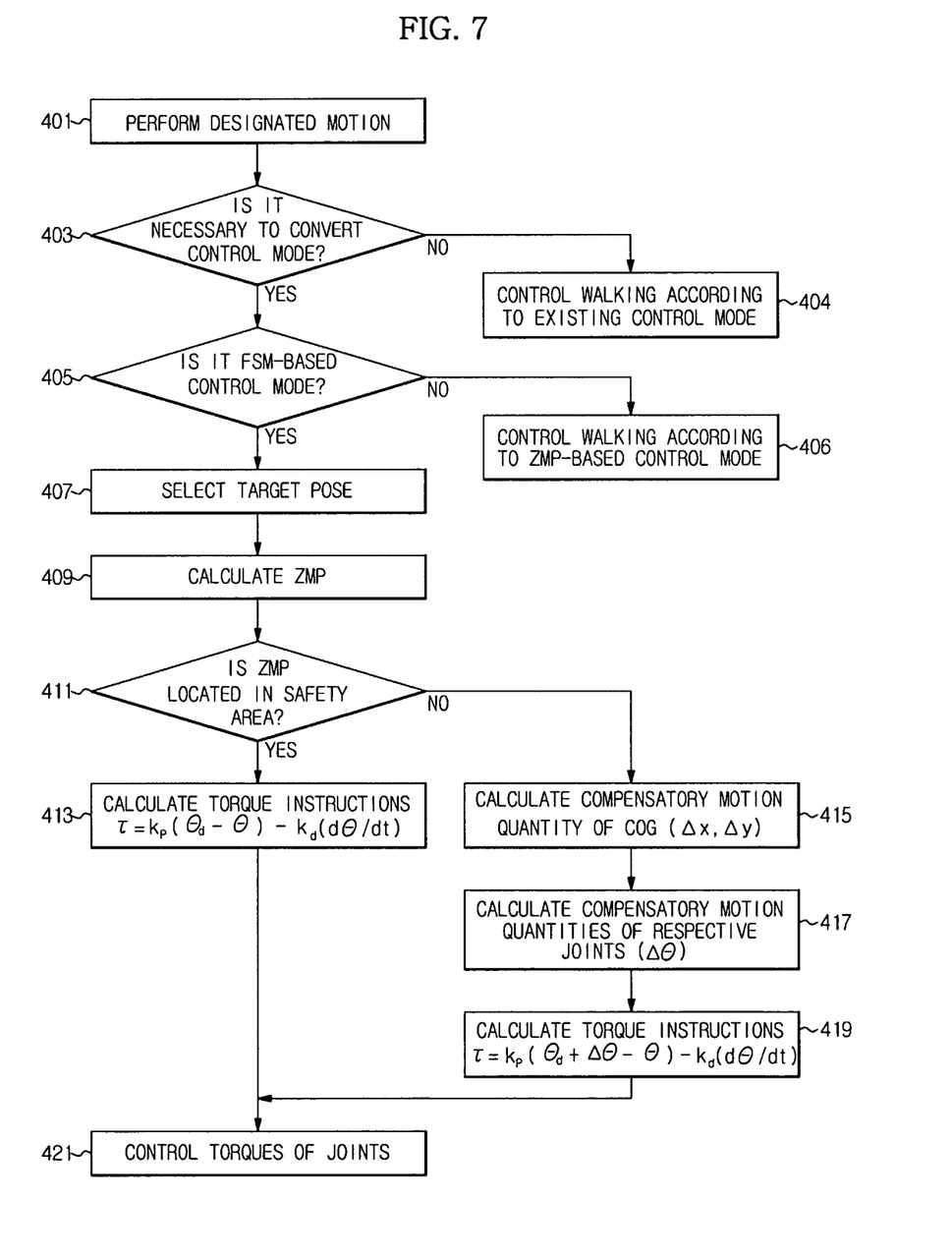
FIG. 7 is a flow chart illustrating a robot walking control method in accordance with the second embodiment.

FIG. 7 is a flow chart illustrating a robot walking control method in accordance with a second embodiment of the present invention. In accordance with this control method, when that new motion instructions are inputted and the motion instructions require the conversion of the control mode, the current control mode of the robot is converted into a preferable control mode to perform the corresponding motion and the robot is controlled in the converted control mode.

When new motion instructions are generated while a designated motion of the robot 100 is performed, the robot 100 determines whether or not it is necessary to convert the current control mode into a different control mode in order to perform a motion corresponding to the new motion instructions (operations 401 and 403).

The control mode of the robot 100 is converted into a control mode required to perform a motion corresponding to the new motion instructions. For example, when the motion corresponding to the new motion instructions is a walking motion on an even topography or a comparatively simple type walking motion, the FSM-based control mode is selected. On the other hand, when the step width of the robot needs to be designated due to an uneven topography, such as stairs, or an obstacle, or the exact control of the motion of the whole body of the robot, such as the opening of a door or the transfer of an article, is required, the ZMP-based control mode is selected.

When the conversion of the control mode is not necessary ('no' in operation 403), the walking of the robot 100 is controlled according to the existing control mode (operation 404).

When the conversion of the control mode is necessary, it is determined whether or not the converted control mode is the FSM-based control mode (operation 405). As a result of the determination, when the ZMP-based control mode is selected as the converted control mode, the walking of the robot 100 is controlled according to the ZMP-based control mode (operation 406).

When the FSM-based control mode is selected as the converted control mode, the motion of the robot 100 is controlled in the FSM control method by the FSM-based walking control unit 318. The control method of FIG. 5, as described in the first embodiment, is applied to subsequent operations 407, 409, 411, 413, 415, 417, and 419, in which the FSM-based walking control unit 318 controls the walking of the robot 100, and thus these operations 407, 409, 411, 413, 415, 417, and 419 will be described in brief.

The FSM-based walking control unit 318 selects a target pose of the robot 100 (operation 407), and the current ZMP of the robot is calculated from the positions, velocities, and accelerations of the respective joints provided through the sensor unit 328 (operation 409). Thereafter, it is determined whether or not the calculated ZMP is located in a safety area (operation 411).

When the calculated ZMP is located in the safety area, it is recognized that the ZMP satisfies the ZMP constraint, and torque instructions ($\tau$) of the joints are calculated using the correspondent Expression 1 (operation 413). When the calculated ZMP is deviated from the safety area, a compensatory motion quantity of the center of gravity (COG) of the robot is calculated using the Expression 2 so that the ZMP of the robot can be located in the safety area satisfying the ZMP constraint (operation 415). Thereafter, compensatory motion quantities of the respective joints are calculated using an inverse kinematical equation (operation 417). When the compensatory motion quantities of the respective joints are calculated, torque instructions of the respective joints are calculated by Expression 3 (operation 419). Thereafter, torques of the respective joints are controlled by the torque instructions of the joints (operation 421), and thus the walking of the robot is stably controlled.

As described above, the robot walking control apparatus of the embodiment control torques of respective joints of a robot so that the ZMP of the robot is located in the safety area, when the motion state of the robot to control the torque-based walking of the robot is selected, thereby simplifying the walking motion of the robot and preventing time delay and energy waste.

Although embodiments of the invention have been shown and described, it would be appreciated by those skilled in the art that changes may be made in these embodiments without departing from the principles and spirit of the invention, the scope of which is defined in the claims and their equivalents.

What is claimed is:

1. A robot walking control apparatus, comprising:
a robot including a plurality of legs, the legs comprising a plurality of joints; and
a controller to control torques of the joints by using at least one of a torque-based walking control method using a finite state machine (FSM) and a position-based walking control method using a zero moment point (ZMP);
wherein the controller calculates the ZMP of the robot when a motion state of the robot included in the FSM is converted, and compensates for motion quantities of the joints of the robot when the ZMP of the robot is located outside the safety area based on position;
wherein the compensating for motion quantities of the joints of the robot comprises calculating a compensatory motion quantity of the center of gravity (COG) based on the difference between a target ZMP satisfying a ZMP constraint and the ZMP of the robot.

2. The robot walking control apparatus according to claim 1, wherein the controller compensates for motion quantities of the joints of the robot so that the ZMP of the robot is located in the safety area.

3. The robot walking control apparatus according to claim 2, wherein the safety area is set to satisfy the ZMP constraint of the robot.

4. The robot walking control apparatus according to claim 2, further comprising a sensor, wherein the controller calculates the ZMP of the robot according to at least a position, a velocity, an acceleration, or combinations thereof, of one of the respective joint obtained using the sensor.

5. A robot walking control apparatus, comprising:
a robot including a plurality of legs, the legs comprising a plurality of joints; and
a controller to select a torque-based control mode using a finite state machine (FSM) or a position-based control mode using a zero moment point (ZMP);
wherein the controller calculates the ZMP of the robot when the torque-based walking control method is selected and a motion state of the robot included in the FSM is converted, and compensates for motion quantities of the joints of the robot when the calculated ZMP of the robot is located outside the safety area based on position;
wherein the compensating for motion quantities of the joints of the robot comprises calculating a compensatory motion quantity of the center of gravity (COG) based on the difference between a target ZMP satisfying a ZMP constraint and the ZMP of the robot.

6. A robot walking control method comprising:
selecting a motion state of a robot based on a torque of joints of the robot;
calculating a zero moment point (ZMP) of the robot when the motion state is converted;
compensating for motion quantities of joints of a robot based on position when the ZMP of the robot is located outside a safety area based on position;
controlling the torques of the joint so that the calculated ZMP of the robot is located in the safety area;
wherein the compensating for motion quantities of the joints of the robot comprises calculating a compensatory motion quantity of the center of gravity (COG) based on the difference between a target ZMP satisfying a ZMP constraint and the ZMP of the robot.

7. The robot walking control method according to claim 6, wherein when the ZMP of the robot is not located in the safety area, compensatory motion quantities of the joints of the robot are calculated by:

$$\Delta x(t_{k+1}) = k(t_k)(P_x(t_k) - P_{xd}(t_k)) + \Delta x(t_k)$$

$$\Delta y(t_{k+1}) = k(t_k)(P_y(t_k) - P_{yd}(t_k)) + \Delta y(t_k)$$

where k is an adjusting parameter, $P_{xd}$ is a target ZMP on the X-axis, $P_x$ is the current ZMP on the X-axis, $P_{yd}$ is a target ZMP on the Y-axis, $P_y$ is the current ZMP on the Y-axis, $(\Delta x(t_{k+1}), \Delta y(t_{k+1}))$ is a compensatory motion quantity of a current center of gravity (COG) of the robot on the X-axis and Y-axis, and $(\Delta x(t_k), \Delta y(t_k))$ is a compensatory motion quantity of the former center of gravity (COG) of the robot on the X-axis and Y-axis.

8. The robot walking control method according to claim 7, wherein torque instructions of the joints of the robot are calculated using the compensatory motion quantities of the joints of the robot according to:

$$\tau = k_p(\theta_d + \Delta\theta - \theta) - k_d(d\theta/dt)$$

where $k_p$ is a P gain in a PD control, $k_d$ is a D gain in the PD control, $\theta_d$ is a target position of a joint, $\theta$ is the current position of the joint, and $\Delta\theta$ is a compensatory motion quality of the joint.

9. A robot walking control method comprising:

selecting a torque-based control mode using a finite state machine (FSM) or a position-based control mode using a zero moment point (ZMP), according to walking conditions determined using user instructions and data received from a sensor unit;

calculating the ZMP of the robot when the torque-based control mode is selected and a motion state included in the FSM is converted;

compensating for motion quantities of joints of a robot based on position when the calculated ZMP of the robot is located outside a safety area based on position;

calculating torque instructions of the joints of the robot according to the compensatory motion quantities of the joints of the robot; and controlling walking the robot according to the calculated torque instructions;

wherein the compensating for motion quantities of the joints of the robot comprises calculating a compensatory motion quantity of the center of gravity (COG) based on the difference between a target ZMP satisfying a ZMP constraint and the ZMP of the robot.

10. The robot walking control method according to claim 9, wherein the compensation of the motion quantities of the joints comprises:

selecting a motion state of the robot; and compensating for the motion quantities of the joints of the robot so that the calculated ZMP of the robot is located in the safety area.

* * * * *